(12) United States Patent
Lee et al.

(10) Patent No.: US 6,785,931 B2
(45) Date of Patent: Sep. 7, 2004

(54) SPACER FOR WINDSHIELD WIPER (75) Inventors: Dong-Hyun Lee, Taegu (KR); Young-Ki Kim, Taegu (KR)

(73) Assignee: K.C.W. Co., Ltd. (KR)

( * ) Notice: Subject to any disclaimer, the term of this patent is extended or adjusted under 35 U.S.C. 154(b) by 2 days.

(21) Appl. No.: 10/328,244

(22) Filed: Dec. 23, 2002

(65) Prior Publication Data

US 2004/0052577 A1 Mar. 18, 2004

(30) Foreign Application Priority Data

Sep. 12, 2002 (KR) .................................. 10-2002-0055504

(51) Int. Cl.[7] .............................. B60S 1/32; F16G 11/00
(52) U.S. Cl. .................... 15/250.46; 403/316; 403/329; 403/24; 403/162; 403/161
(58) Field of Search .................. 15/250.46, 250.44, 15/250.361; 403/315, 316, 363, 161, 162, 24, 158, 329

(56) References Cited

U.S. PATENT DOCUMENTS 5,183,352 A * 2/1993 Carpenter .................... 403/79
5,647,087 A * 7/1997 Arai .......................... 15/250.46

FOREIGN PATENT DOCUMENTS

DE            2803343       * 8/1979 .............. 15/250.46

* cited by examiner

Primary Examiner—Gary K. Graham
(74) Attorney, Agent, or Firm—Cantor Colburn LLP (57) ABSTRACT Disclosed is a spacer of a windshield wiper for a vehicle including an upper panel, a pair of side panels extending downwardly from opposite lateral ends of the upper panel while defining a receiving space therebetween, the side panels being centrally formed with through holes, respectively, and annular protrusions protruded, toward each other, from the side panels around the through holes, and adapted to be fitted in through holes formed at an element of the windshield wiper to be assembled with the spacer, respectively. Each of the protrusions has a tapered structure having a diameter gradually reduced toward a free end of the protrusion, while having an annular step formed at the free end of each of the protrusions, and a plurality of slits formed at the annular step. In accordance with this structure, it is possible to prevent the spacer from being separated from an associated element of the windshield wiper upon assembling the elements of the windshield, while increasing the clamping force of the spacer, thereby minimizing the clearance defined between the spacer and the associated element.

3 Claims, 8 Drawing Sheets

SPACER FOR WINDSHIELD WIPER

BACKGROUND OF THE INVENTION

1. Field of the Invention

The present invention relates to a spacer for a windshield wiper, and more particularly to a spacer for a windshield wiper which is provided with retaining means for preventing the spacer from being separated from an associated element of the windshield wiper upon assembling the elements of the windshield, while increasing the clamping force of the spacer, thereby minimizing the clearance defined between the spacer and the associated element.

2. Description of the Related Art

As well known, a windshield wiper for a vehicle is adapted to wipe raindrops and snow attached to the front windshield of the vehicle, thereby ensuring a desired forward visibility during the running of the vehicle. Such a windshield wiper includes a metal yoke assembly, and a blade rubber assembly coupled to the metal yoke assembly.

In such a windshield wiper, spacers are used as connecting means for firmly connecting the constitutive elements of the metal yoke assembly in order to allow the windshield wiper to operate without generating vibrations.

Figure 5A:
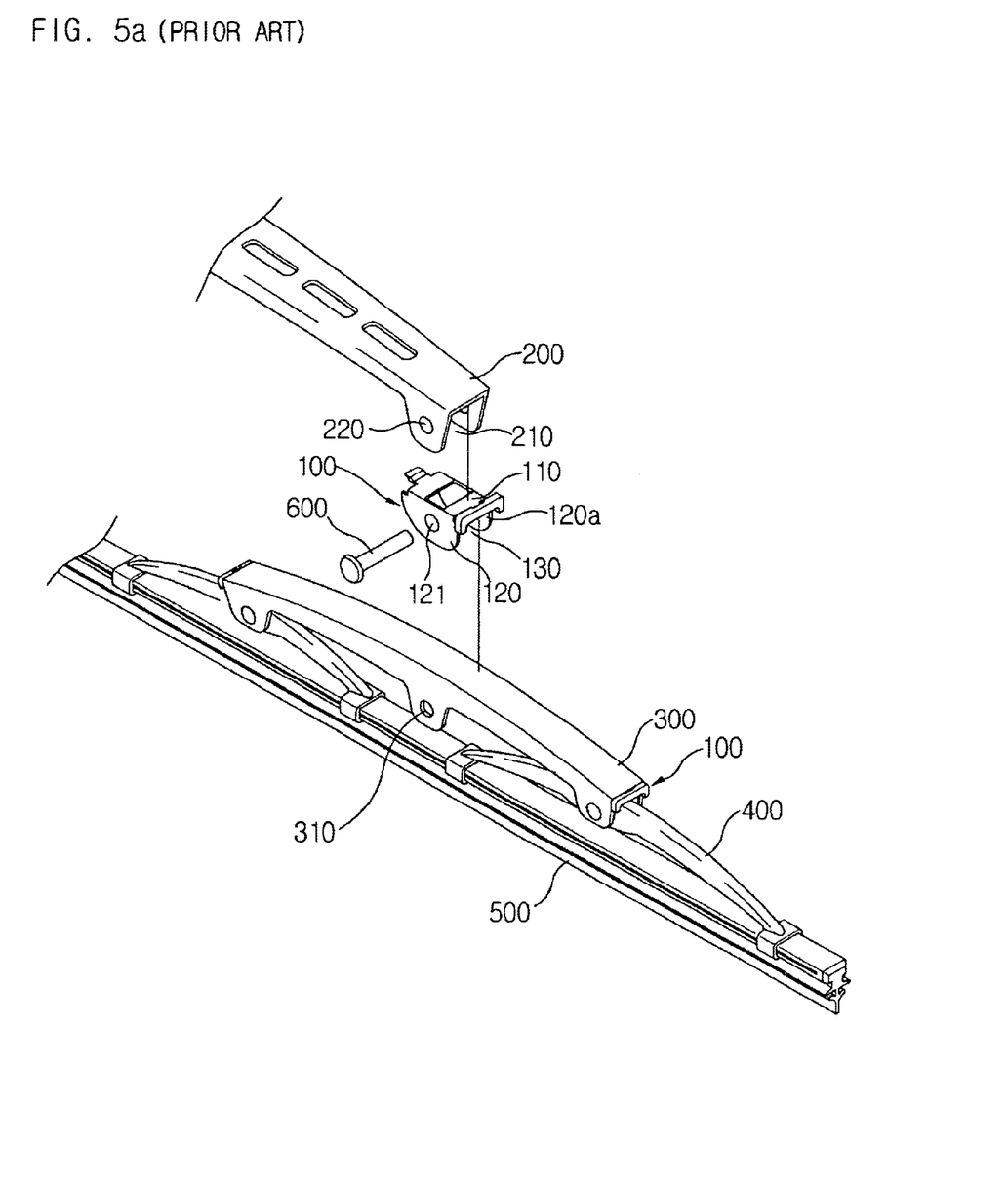
Figure 5B:
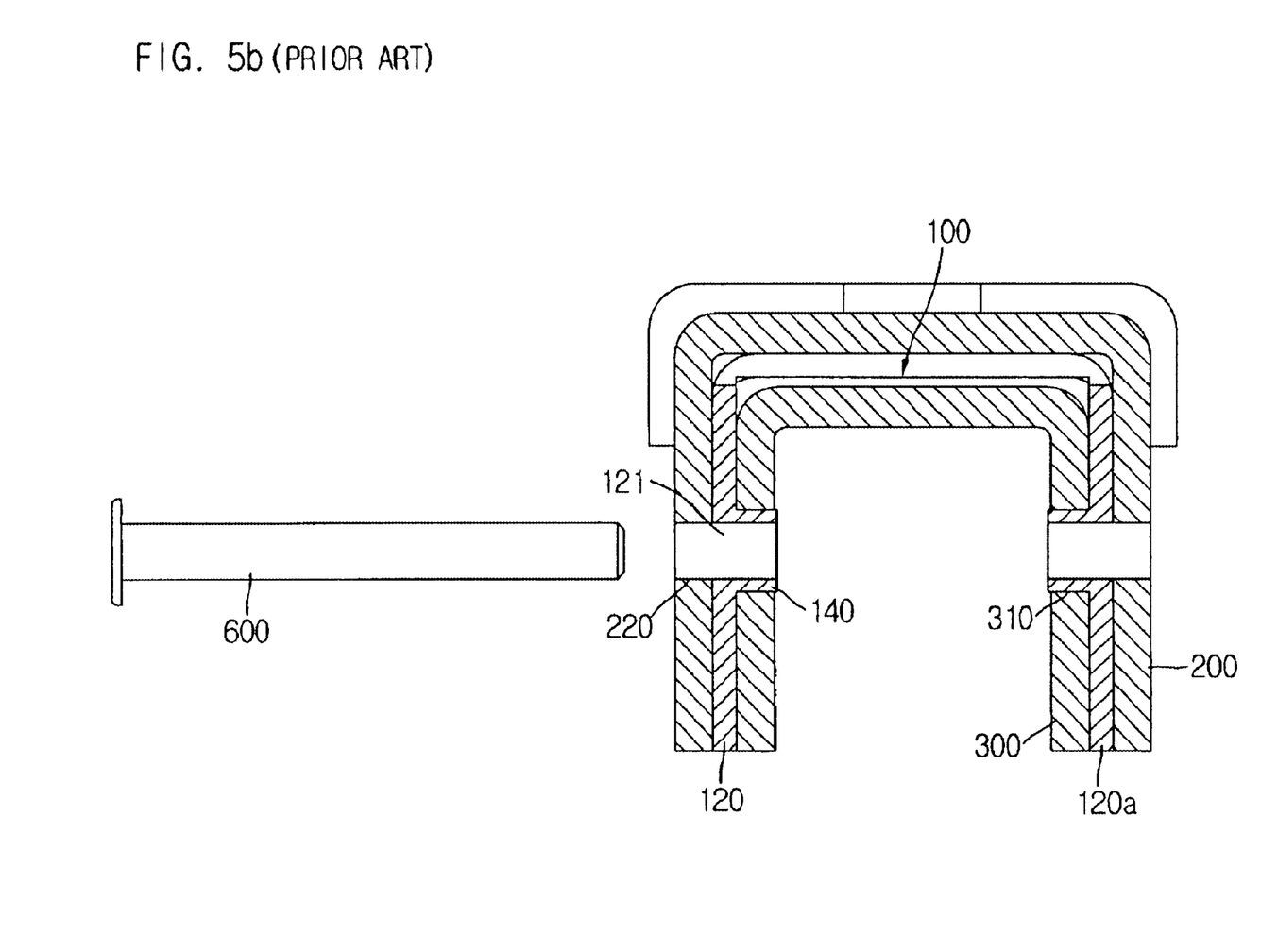

Referring to FIGS. 5a and 5b, a windshield wiper is illustrated in which conventional spacers are coupled among the constitutive elements of a metal yoke assembly included in the windshield wiper, respectively.

As shown in FIGS. 5a and 5b, a primary yoke member 300 is pivotably coupled to a wiper arm 200 by a spacer 100. A pair of secondary yoke members 400 are pivotably coupled to both ends of the primary yoke member 300 by other spacers 100, respectively. A blade rubber assembly including a blade rubber element 500 is coupled to the secondary yoke members 400.

The wiper arm 200 has an inverted-U-shaped coupling end defining a spacer receiving space 210 while having rivet holes 220 at both sides of the spacer receiving space 210. A rivet 600 extends through the rivet holes 220.

Each spacer 100 has an inverted-U-shaped structure including an upper panel 110, and a pair of side panels 120 and 120a extending downwardly from opposite lateral ends of the upper panel 110. A receiving space 130 is defined by the upper panel 110 and the side panels 120 and 120a. Through holes 121 corresponding to the rivet holes 220 are centrally formed at the side panels 120 and 120a. Annular protrusions 140 are inwardly protruded from respective through holes 121 such that they face each other.

The primary yoke member 300 has, at its central portion, an inverted-U-shaped structure having through holes 310 respectively corresponding to the through holes 121 of the spacer 100 in which the central portion of the primary yoke member 300 is to be received. Similarly, each secondary yoke member 400 has, at its central portion, an inverted-U-shaped structure having through holes respectively corresponding to the through holes of the spacer 100 in which the central portion of the secondary yoke member 400 is to be received.

In the process of assembling the above mentioned elements of the windshield wiper, the primary yoke member 300 is first fitted, at its central portion, in the receiving space 130 of the associated spacer 100 such that the protrusions 140 of the spacer 100 are received in the through holes 310 of the primary yoke member 300. The spacer 100 assembled with the primary yoke member 300 is then fitted in the spacer receiving space 210 of the wiper arm 200 such that the rivet holes 220 are aligned with the through holes 121 and 310 of the spacer 100. Thereafter, the rivet 600 is inserted through the aligned holes 220, 121, and 310.

Thus, the primary yoke member 300 is pivotably coupled to the wiper arm 200 in a state in which the spacer 100 is interposed between the wiper arm 200 and the primary yoke member 300. In the same manner, the secondary yoke members 400 can be pivotably coupled to the primary yoke member 300.

The side panels 120 and 120a of the spacer 100 should be forcibly moved away from each other to widen the space defined therebetween when the primary yoke member 300 is fitted in the spacer 100, in order to prevent the fitting operation of the primary yoke member 300 from being obstructed by the protrusions 140. However, although the force applied to the side panels 120 and 120a is released, the side panels 120 and 120a are incompletely recovered to their original state, thereby forming a clearance between the spacer 100 and the primary yoke member 300. For this reason, vibrations are generated during an operation of the windshield wiper, so that it is impossible to effectively remove the moisture attached to the front windshield of the vehicle.

In addition to the formation of the clearance, the conventional windshield wiper has another problem in that the clamping force of the side panels 120 and 120a in the primary yoke member 300 is small because the side panels 120 and 120a are thin. Furthermore, the protrusions 140 of the spacer 100 may be easily separated from the through holes 310 of the primary yoke member 300. For this reason, the primary yoke member 300 may be downwardly separated from the spacer 120 when an external force is applied to the spacer 10 or primary yoke member 300 during the assembling process. Where an automatic riveting process is used, the spacer 120 assembled with the primary yoke member 300 may be separated from the primary yoke member 300 due to an impact or vibration generated during a procedure for moving the assembly to a stage for carrying out the riveting process. As a result, the efficiency of the assembling process is degraded, thereby reducing the productivity of the windshield wiper.

SUMMARY OF THE INVENTION

The present invention has been made in view of the above mentioned problems, and an object of the invention is to provide a spacer for a windshield wiper which is provided with retaining means capable of preventing the spacer from being separated from a primary or secondary yoke member due to an external impact applied to the spacer.

Another object of the invention is to provide a spacer for a windshield wiper which is provided with retaining means capable of easily assembling the spacer to a desired element of the windshield wiper while firmly maintaining the assembled state of the spacer.

Another object of the invention is to provide a spacer for a windshield wiper which is provided with retaining means capable of increasing the clamping force of the spacer to be assembled with a primary or secondary yoke member, thereby minimizing the clearance formed between the spacer and the primary or secondary yoke member.

In accordance with the present invention, this object is accomplished by providing a spacer of a windshield wiper for a vehicle including an upper panel, a pair of side panels extending downwardly from opposite lateral ends of the upper panel while defining a receiving space therebetween, the side panels being centrally formed with through holes, respectively, and annular protrusions protruded, toward each other, from the side panels around the through holes, and adapted to be fitted in through holes formed at an element of the windshield wiper to be assembled with the spacer, respectively, wherein each of the protrusions has a tapered structure having a diameter gradually reduced toward a free end of the protrusion, while having retaining means adapted to retain the protrusions in a state of being fitted in the through holes of the windshield wiper element, the retaining means comprising an annular step formed at the free end of each of the protrusions, and a plurality of slits formed at the annular step.

Preferably, the step has a vertical surface at an end thereof spaced away from the free end of the protrusion associated therewith, and an inclined outer surface.

Preferably, each of the protrusions has an inclined inner surface having a diameter gradually reduced toward the free end of the protrusion.

BRIEF DESCRIPTION OF THE DRAWINGS

The above objects, and other features and advantages of the present invention will become more apparent after a reading of the following detailed description when taken in conjunction with the drawings, in which:

FIGS. 3a and 3b illustrate an assembled state of the spacer according to the present invention before a riveting process is carried out, in which FIG. 3a is a sectional view, and FIG. 3b is an enlarged view corresponding to a portion A of FIG. 3a;

FIGS. 4a and 4b illustrate the assembled state of the spacer according to the present invention after the riveting process is completed, in which FIG. 4a is a sectional view, and FIG. 4b is an enlarged view corresponding to a portion B of FIG. 4a; and FIGS. 5a and 5b illustrate a conventional spacer used in a windshield wiper, in which FIG. 5a is an exploded perspective view, and FIG. 5b is an assembled sectional view.

DESCRIPTION OF THE PREFERRED EMBODIMENT

Now, preferred embodiments of the present invention will be described with reference to the annexed drawings.

Figure 1:
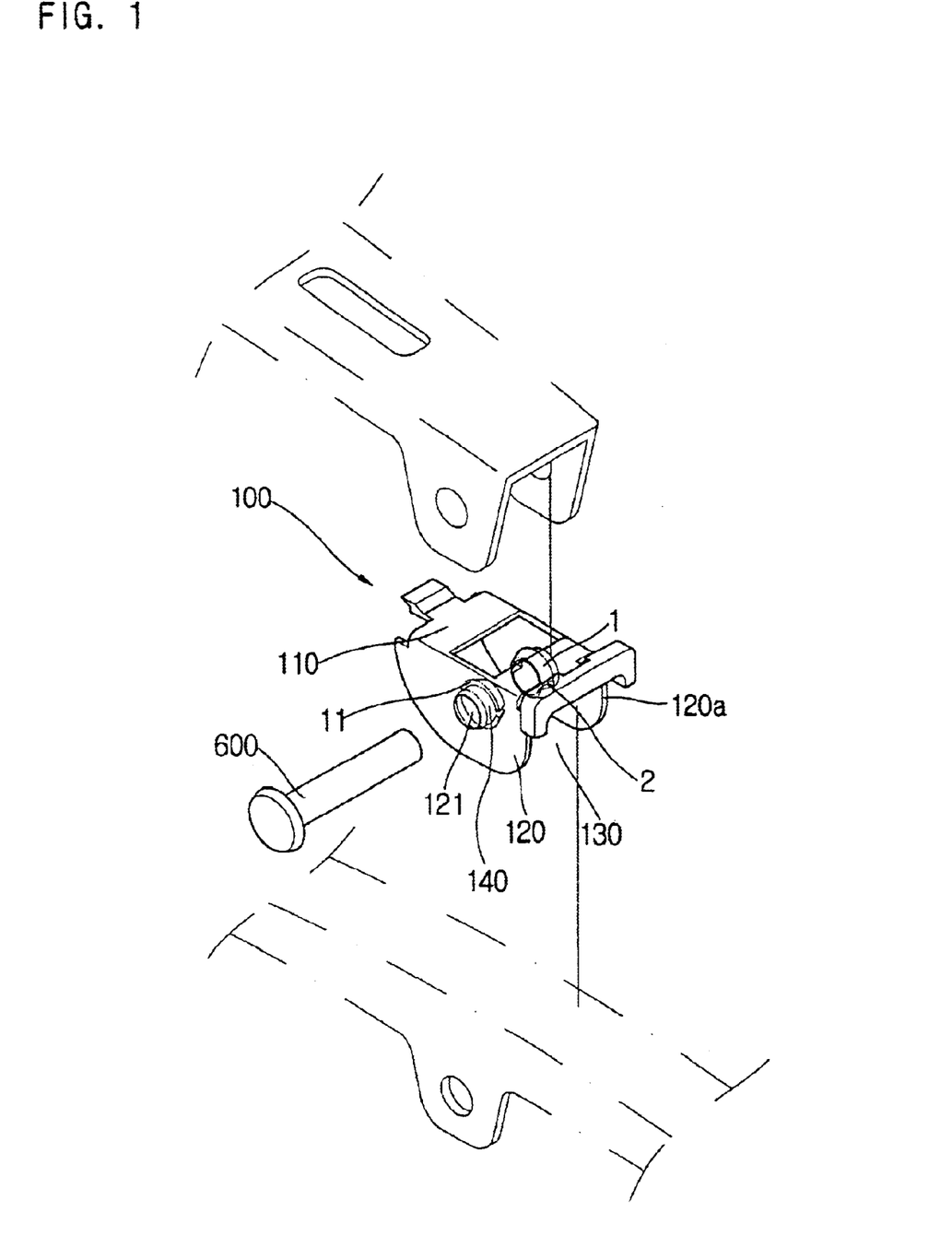
FIG. 1 is a perspective view illustrating a spacer for a windshield wiper according to the present invention.
Figure 2:
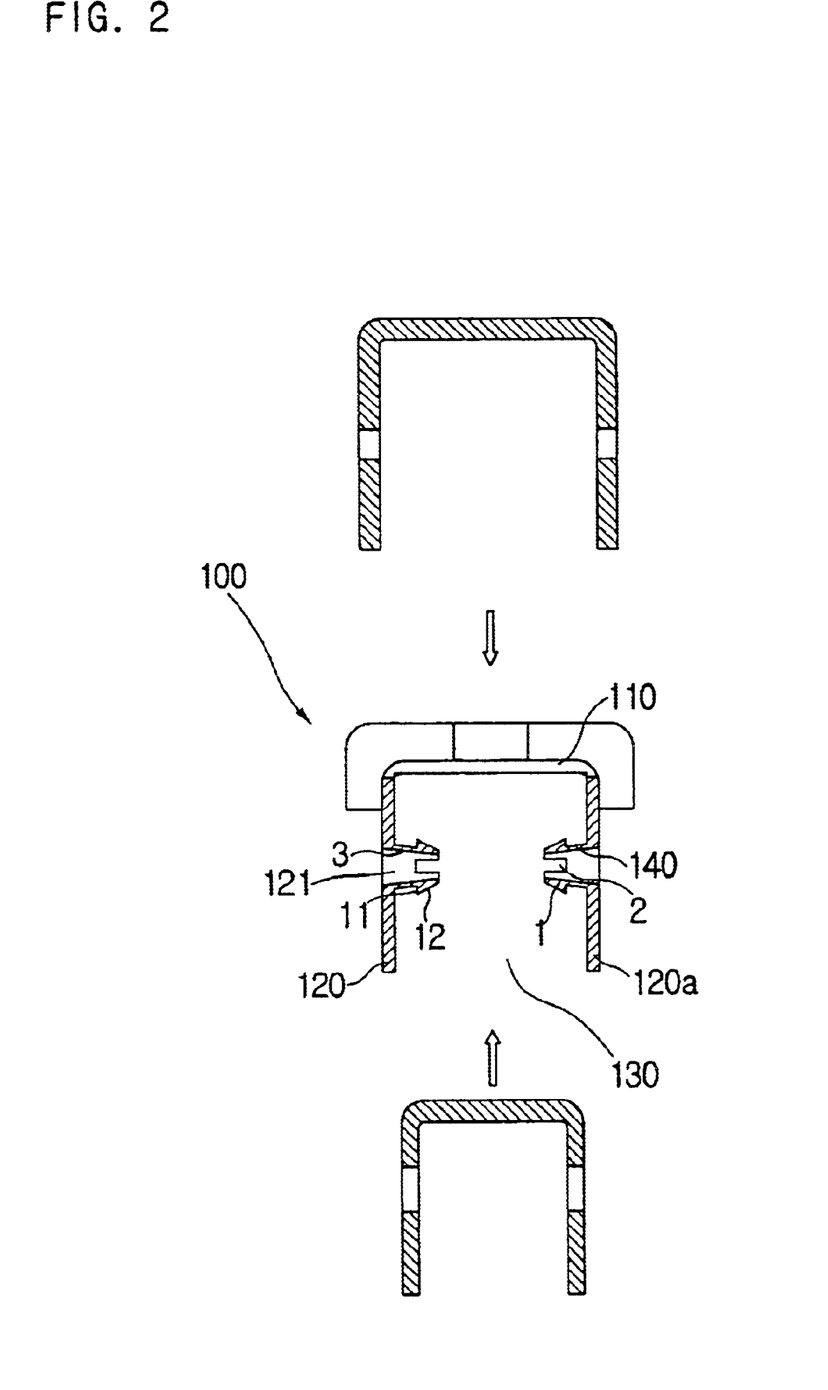
FIG. 2 is a sectional view illustrating the spacer according to the present invention.

FIG. 1 is a perspective view illustrating a spacer for a windshield wiper according to the present invention. FIG. 2 is a sectional view illustrating the spacer. In FIGS. 1 and 2, elements respectively corresponding to those in FIGS. 5a and 5b are denoted by the same reference numerals.

Referring to FIGS. 1 and 2, the spacer of the present invention, which is denoted by the reference numeral 100, has an inverted-U-shaped structure including an upper panel 110, and a pair of side panels 120 and 120a extending downwardly from opposite lateral ends of the upper panel 110. A receiving space 130 is defined by the upper panel 110 and the side panels 120 and 120a. Through holes 121 are centrally formed at the side panels 120 and 120a, respectively. Annular protrusions 140 are inwardly protruded from respective through holes 121 such that they face each other. Each annular protrusion 140 has a tapered structure having a diameter gradually reduced toward a free end thereof. The annular protrusion 140 has an annular step 1 at the free end thereof. The step 1 has an inclined surface 12 at its outer surface. The step 1 also has a plurality of uniformly spaced longitudinal slits 2. An inclined surface 3 is formed at the inner surface of each protrusion 140 connected to the associated through hole 121.

The spacer 100 is made of a plastic material while having a small thickness at its side panels 120 and 120a so that the side panels 120 and 120a can be elastically moved away from each other when a primary or secondary yoke member is inserted into the receiving space 130. Accordingly, it is possible to prevent the insertion of the primary or secondary yoke member from being obstructed by the protrusions 140. Thus, there is no degradation in the efficiency of the assembling process.

The step 1 is provided at its rear end with a vertical surface 11. The step 1 has a diameter larger than the diameter of through holes formed at the primary or secondary yoke member, and adapted to receive respective protrusions 140, so that the spacer 100 is prevented from being separated from the primary or secondary yoke member in an assembled state due to an external impact applied thereto.

The inclined outer surface 12 of the step 1 serves to allow its protrusion 140 to be easily inserted into the through hole of the primary or secondary yoke member.

The slits 2 serve to allow the step 1 to be reduced in diameter when a circumferential compressive force is applied to the step 1 as the protrusion 140 is forcibly inserted into the through hole of the primary or secondary yoke member, thereby allowing the step 1 to pass through the through hole. Since the protrusion 140 also has the inclined inner surface 3, a rivet 600 can be tightly fitted in the through hole 121 connected to the protrusion 140.

That is, the inclined inner surface 3 has a diameter gradually reduced toward the free end of the protrusion 140. Accordingly, when the rivet 600 is inserted into the through hole 121 via the protrusion 140, it pushes the slit end of the protrusion 140 radially outwardly. As a result, the rivet 600 is tightly fitted in the through hole 121 connected to the protrusion 140. At this time, the vertical surface 11 of the step 1 is urged against the inner surface of the primary or secondary yoke member around the through hole of the primary or secondary yoke member in accordance with the radial outward movement of the slit end of the protrusion 140. Thus, it is possible to minimize the clearance defined between each side panel 120 or 120a of the spacer 100 and an associated side panel of the primary or secondary yoke member.

Figure 3A:
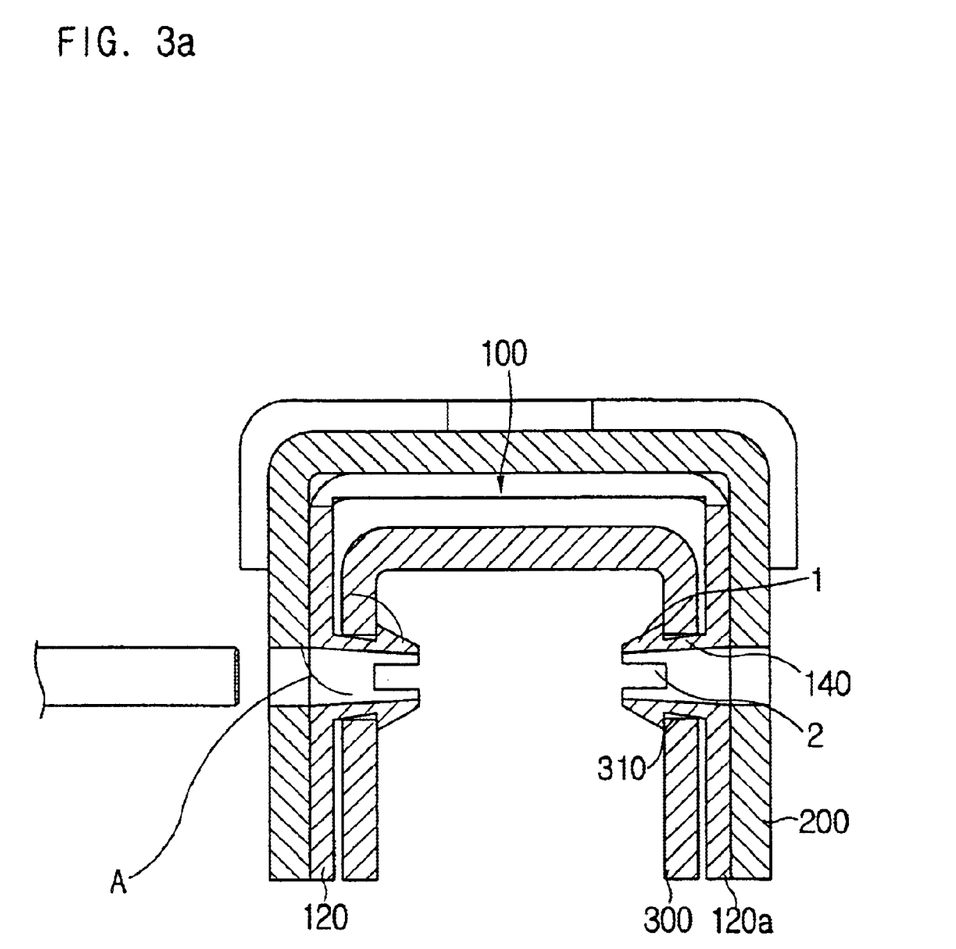
Figure 3B:
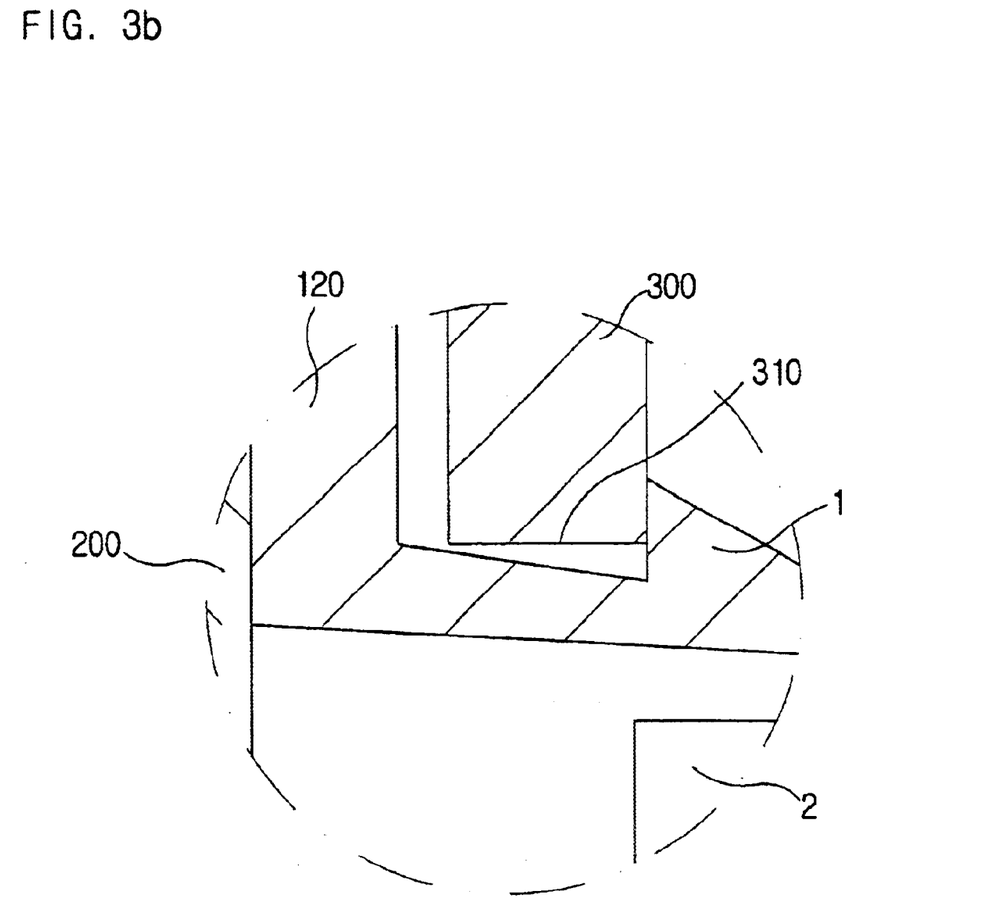

FIGS. 3a and 3b illustrate the assembled state of the spacer 100 before a riveting process is carried out. FIG. 3a is a sectional view whereas FIG. 3b is an enlarged view corresponding to a portion A of FIG. 3a.

When the primary or secondary yoke member, for example, the primary yoke member 300, is inserted into the receiving space 130 of the spacer, each protrusion 140 of the spacer 100 can be inserted into an associated through hole 310 of the primary yoke member 300 as the step 1 is reduced in diameter by virtue of the slits 2. After passing through the through hole 310, the step 1 is enlarged to its original state by its elastic force. In this state, it is possible to prevent the spacer 100 from being separated from the primary yoke member 300 due to an external impact applied thereto because the step 1 has a diameter larger than that of the through hole 310.

When the primary yoke member 300 is inserted into the receiving space 130 of the spacer 100, the side panels 120 and 120a of the spacer 100 should be forcibly moved away from each other to widen the space defined therebetween when the primary yoke member 300 is fitted in the spacer 100, in order to prevent the fitting operation of the primary yoke member 300 from being obstructed by the protrusions 140. However, although the force applied to the side panels 120 and 120a is released, the side panels 120 and 120a are incompletely recovered to their original state, thereby forming a clearance between each side panel of the spacer 100 and the facing side pane of the primary yoke member 300. Furthermore, there may an additional clearance between the facing side panels of the spacer 100 and primary yoke member 300 due to a design tolerance.

In accordance with the present invention, such clearances can be effectively eliminated, as described hereinafter.

Figure 4A:
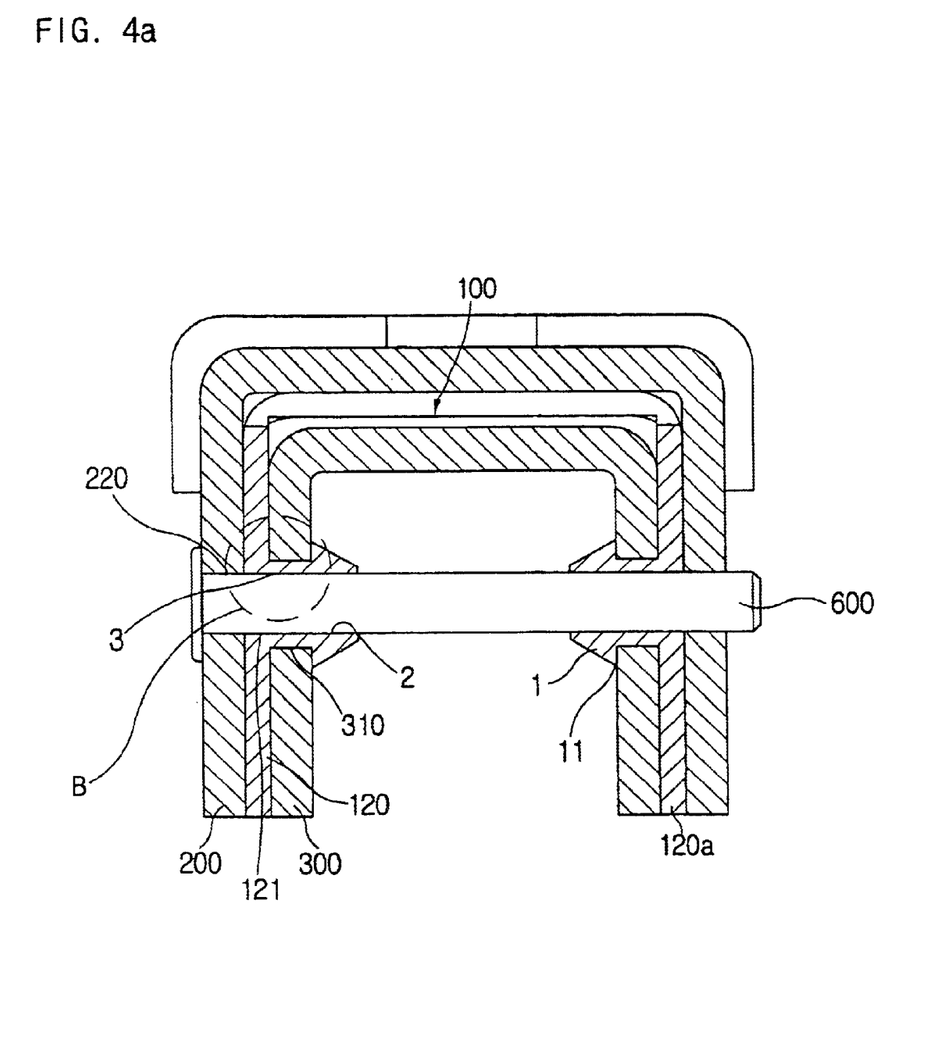
Figure 4B:
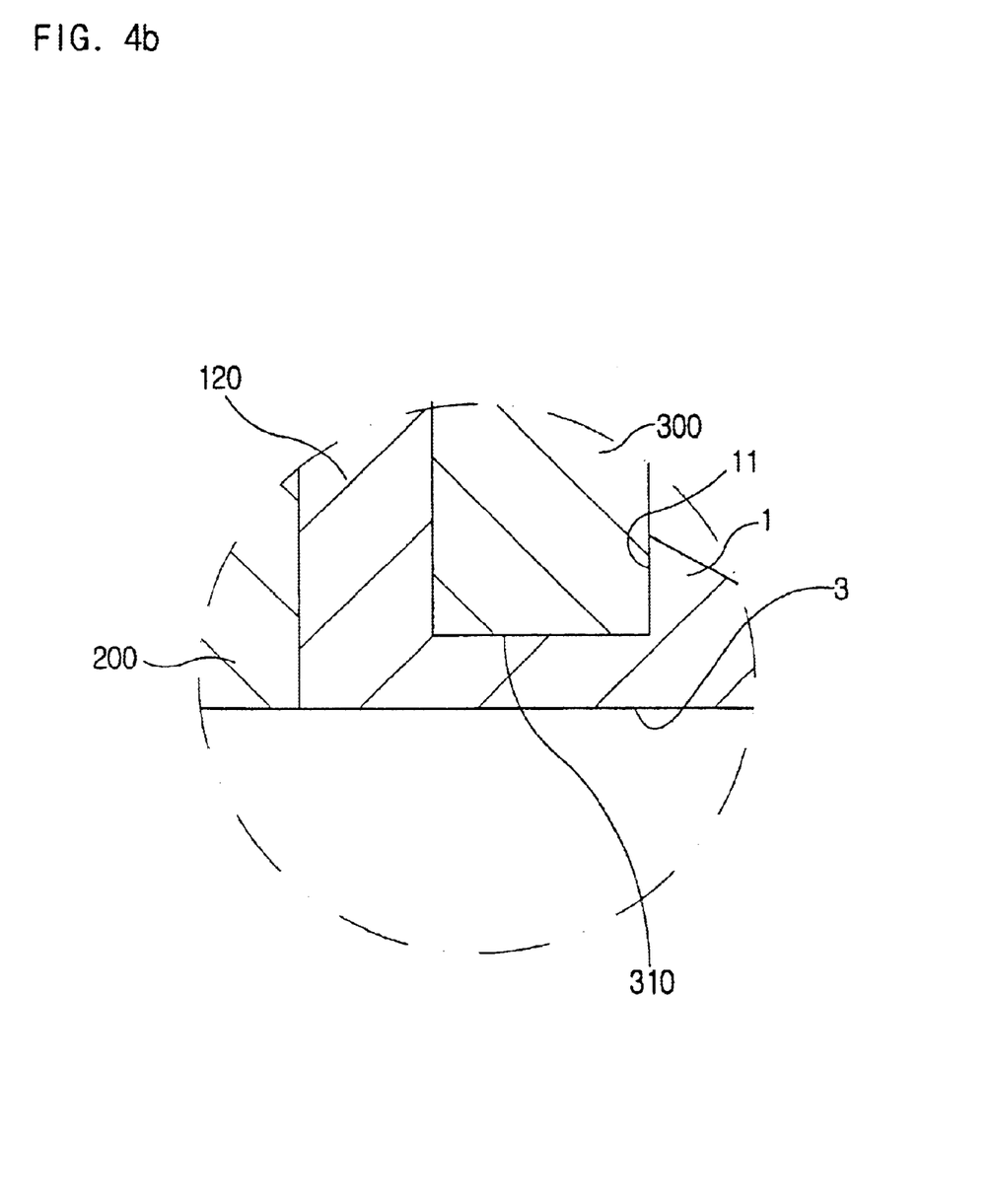

FIGS. 4a and 4b illustrate the assembled state of the spacer 100 after the riveting process is completed. FIG. 4a is a sectional view whereas FIG. 4b is an enlarged view corresponding to a portion B of FIG. 4a.

In the riveting process, the rivet 600 is inserted into a rivet hole, for example, a rivet hole 220 formed at a wiper arm 200. The inserted rivet 600 passes through the through holes 121 and 310 to couple the primary yoke member 300 to the wiper arm 200 in a state in which the spacer 100 is interposed between the wiper arm 200 and the primary yoke member 300.

The rivet 600 is tightly fitted in the through holes 121 respectively connected to the protrusions 140 because each of the protrusion 140 has an inclined inner surface, that is, the inclined surface 3. When the rivet 600 is inserted into each through hole 121 via the associated protrusion 140, it pushes the slit end of the protrusion 140 radially outwardly. As a result, the vertical surface 11 of the step 1 is urged against the inner surface of the primary yoke member 300 around the through hole 310 of the primary yoke member 300, thereby minimizing the clearance defined between each side panel 120 or 120a of the spacer 100 and an associated side panel of the primary yoke member 300.

Thus, it is possible to prevent the windshield wiper from vibrating during its operation, thereby efficiently removing the moisture attached to the windshield.

As apparent from the above description, the present invention provides a spacer for a windshield which includes an upper panel, and a pair of side panels extending downwardly from opposite lateral ends of the upper panel to define a receiving space. Through holes are centrally formed at the side panels, respectively. Annular protrusions each having a tapered structure are inwardly protruded from respective through holes. Each annular protrusion is provided at a free end thereof with an annular step while having slits. In accordance with this structure, when a primary or secondary yoke member is inserted into the receiving space of the spacer, each protrusion of the spacer can be inserted into an associated through hole of the yoke member as the step is reduced in diameter by virtue of the slits. After passing through the through hole, the step 1 is enlarged to its original state by its elastic force. In this state, it is possible to prevent the spacer from being separated from the yoke member due to an external impact applied thereto because the step is engaged with the inner surface of the yoke member. Accordingly, an enhancement in the efficiency of the assembling process is achieved, thereby achieving an enhancement in the productivity of the windshield wiper.

Since each protrusion of the spacer can be easily inserted into the through hole of the yoke member without being easily separated from the through hole by virtue of its inclined surface and vertical surface, the process for assembling the spacer with the yoke member can be efficiently and reliably achieved.

Each protrusion also has an inclined inner surface having a diameter gradually reduced toward the free end of the protrusion. Accordingly, when a rivet is inserted into a rivet hole in a riveting process in a state in which the elements of the windshield wiper are assembled with the spacer, it pushes the slit end of each protrusion radially outwardly, so that the vertical surface of the step in the protrusion is urged against the inner surface of the yoke member around the through hole of the yoke member, thereby minimizing the clearance defined between each side panel of the spacer and an associated side panel of the yoke member. Thus, it is possible to prevent the windshield wiper from vibrating during its operation, thereby efficiently removing the moisture attached to the windshield.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A spacer of a windshield wiper for a vehicle, comprising:
   an upper panel;
   a pair of side panels extending downwardly from opposite lateral ends of the upper panel defining a receiving space therebetween, the side panels including first through holes formed centrally therein; and
   annular protrusions protruded toward each other from the side panels around the through holes and adapted to be fitted in second through holes formed at an element of the windshield wiper to be assembled with the spacer;
   wherein each of the protrusions includes a tapered structure having a diameter gradually reduced toward a free end of the protrusion and retaining means adapted to retain the protrusions in the second through holes of the windshield wiper element, the retaining means comprising an annular step formed at the free end of each of the protrusions and a plurality of slits formed at the annular step.

2. The spacer according to claim 1, wherein the step has a vertical surface at an end thereof spaced away from the free end of the protrusion associated therewith, and an inclined outer surface.

3. The spacer according to claim 1, wherein each of the protrusions has an inclined inner surface having a diameter gradually reduced toward the free end of the protrusion.

* * * * *